(12) United States Patent
Somerville (10) Patent No.: US 9,829,300 B2
(45) Date of Patent: Nov. 28, 2017

(54) GAUGE ARTEFACT AND METHOD FOR CHECKING A COORDINATE POSITIONING MACHINE

(71) Applicant: RENISHAW PLC, Wotton-under-Edge, Gloucestershire (GB)

(72) Inventor: Leo Christopher Somerville, St. Charles, IL (US)

(73) Assignee: RENISHAW PLC, Wotton-under-Edge (GB)

( * ) Notice: Subject to any disclaimer, the term of this patent is extended or adjusted under 35 U.S.C. 154(b) by 278 days.

(21) Appl. No.: 14/364,143

(22) PCT Filed: Dec. 19, 2012

(86) PCT No.: PCT/GB2012/000915
§ 371 (c)(1),
(2) Date: Jun. 10, 2014

(87) PCT Pub. No.: WO2013/093397
PCT Pub. Date: Jun. 27, 2013

(65) Prior Publication Data
US 2014/0345359 A1    Nov. 27, 2014

Related U.S. Application Data

(60) Provisional application No. 61/577,928, filed on Dec. 20, 2011.

(30) Foreign Application Priority Data

Feb. 15, 2012 (GB) .................................. 1202557.3

(51) Int. Cl.
*G01B 5/008* (2006.01)
*G01B 21/04* (2006.01)

(52) U.S. Cl.
CPC ........... *G01B 5/008* (2013.01); *G01B 21/042* (2013.01)

(58) Field of Classification Search
CPC ..... G01B 5/008; G01B 21/042; G01B 24/045
(Continued)

(56) References Cited

U.S. PATENT DOCUMENTS 5,345,690 A * 9/1994 McMurtry ............. G01B 5/012
33/558
5,430,948 A    7/1995 Vander Wal, III
(Continued)

FOREIGN PATENT DOCUMENTS

CN    202066495 U    12/2011
DE    37 19 838 A1    12/1988
(Continued)

OTHER PUBLICATIONS

Dec. 3, 2015 Office Action issued in Chinese Patent Application No. 201280063076.8.
(Continued)

*Primary Examiner* — Peter Macchiarolo
*Assistant Examiner* — Nathaniel Kolb
(74) *Attorney, Agent, or Firm* — Oliff PLC (57) ABSTRACT

This invention concerns a gauge artifact including a base for mounting on a table of a coordinate positioning machine and a platform including at least two portions having a nominally identical geometric property. The platform is locatable relative to the base in at least two positions such that each of the at least two portions having the nominally identical geometric property can be presented at a common location relative to the base. The platform may be arranged such that the positions of the portions having a nominally identical geometric property can be interchanged by movement of the platform between at least two distinct positions. The posi- (Continued)

tions may be interchanged through rotation of the platform. The invention also concerns a method of checking a coordinate measuring machine.

25 Claims, 9 Drawing Sheets

(58) Field of Classification Search
USPC .......................................................... 73/1.79
See application file for complete search history.

(56) References Cited

U.S. PATENT DOCUMENTS

| | | | |
|---|---|---|---|
| 5,671,541 A | 9/1997 | Dai et al. | |
| 5,918,378 A * | 7/1999 | McMurtry | G01B 7/012 33/556 |
| 6,493,956 B1 | 12/2002 | Matsuda | |
| 6,513,253 B2 * | 2/2003 | Matsuda | G01B 3/30 33/502 |
| 2001/0045021 A1 * | 11/2001 | Matsuda | G01B 3/30 33/502 |
| 2005/0068523 A1 | 3/2005 | Wang et al. | |
| 2006/0115784 A1 * | 6/2006 | McMurtry | A61C 9/0093 433/49 |
| 2009/0002486 A1 | 1/2009 | Fricke et al. | |

FOREIGN PATENT DOCUMENTS

| | | | | |
|---|---|---|---|---|
| DE | 10 2004 022 750 A1 | 12/2005 | | |
| EP | 1 146 314 A2 | 10/2001 | | |
| JP | 2001-330428 A | 11/2001 | | |
| JP | 2005515458 A | 5/2005 | | |
| JP | 2009-271030 | * 11/2009 | ............... | G01B 5/24 |
| JP | 2009271030 A | 11/2009 | | |
| WO | WO 9106396 A2 * | 5/1991 | ............ | B23Q 16/08 |
| WO | WO 02/090879 A2 | 11/2002 | | |
| WO | WO 2011/107729 A1 | 9/2011 | | |
| WO | WO 2011/107746 A1 | 9/2011 | | |

OTHER PUBLICATIONS

Search Report issued in British Application No. 1202557.3 dated Jun. 10, 2012.
International Search Report issued in International Patent Application No. PCT/GB2012/000915 dated Jun. 13, 2013.
Written Opinion issued in International Patent Application No. PCT/GB2012/000915 dated Jun. 13, 2013.
Sep. 18, 2016 Office Action issued in Chinese Patent Application No. 201280063076.8.
Dec. 6, 2016 Office Action issued in Japanese Application No. 2014-548167.
Jun. 2, 2017 Office Action issued in Chinese Patent Application No. 201280063076.8.

* cited by examiner

Fig. 9 ns will be less than 1 mm if not of the order of hundreds or tens of micrometers or smaller.

Measurements of a coordinate positioning machine may be checked using a gauge artefact according to the invention by positioning the platform on the base to present, at least at the common location, a series of nominally identical parts, comparing a measured deviation in the geometric property for each part to a known deviation and correcting for any difference between the measured deviation and the known deviation. The gauge artefact is a calibrated gauge artefact, wherein the difference in the geometric property of the two portions is known. For example, the known deviation may have been obtained by measuring the gauge artefact on a coordinate positioning machine that has already been calibrated. In particular, a deviation in the nominally identical geometric property of the portions may be of a comparable size to the expected deviations in a set of parts N to be measured and the gauge artefact can be used to check and, possibly, correct, the coordinate positioning machine for measuring deviations of this magnitude.

The term "gauge artefact" as used herein is not limited to a device that can be used to measure dimensions but means a device comprising set dimensions against which checks can be carried out.

The nominally identical geometric property of the portions may differ in its shape, size, relative location of features and/or position when mounted on the base in the common location. In one embodiment, the sizes of the geometric property differs whilst the shape remains the same (ie, a ratio of dimensions, such as length, width, height, radii, which define the shape remain the same but only change in magnitude). For example, the portions having a nominally identical geometric property may both comprise spheres with different radii. In such an arrangement, the base and platform may be arranged such that the centre of each sphere can be positioned at a common point relative to the base. Alternatively or additionally, the portions having a nominally identical geometric property may comprise features having a common shape of the same size but the positions of these features differing (slightly) when located in the common location relative to the base. In a further arrangement, each portion may comprise two features, each feature identical in size and shape but differing in their relative positioning. An example of this arrangement is one of the portions comprising concentric bores whilst the other portion comprises eccentric bores or, alternatively, each portion having eccentric bores, having centres offset by differing amounts. In a further arrangement, the portions may comprise comparable but differing shapes. For example, surfaces of each portion may define an ellipse with differing ratios between the major and minor axes (a circle being a special case of an ellipse). In a further arrangement, the size, shape and position of the geometric property differs between the portions.

Preferably, the platform is arranged such that the positions of the at least two portions having a nominally identical geometric property relative to the base can be interchanged by movement of the platform between the at least two positions. In this way, the gauge artefact provides two or more locations in which the coordinate positioning machine can be checked for a single position of the base in the coordinate positioning machine.

According to a second aspect of the invention there is provided a gauge artefact comprising a base and a platform locatable on the base in two or more distinct positions, the platform comprising at least two portions having a nominally identical geometric property whose positions relative

GAUGE ARTEFACT AND METHOD FOR CHECKING A COORDINATE POSITIONING MACHINE

This invention concerns a gauge artefact and a method of checking a coordinate positioning machine. The invention has particular, but not exclusive, application to a gauge artefact and a method of checking a non-Cartesian coordinate positioning machine, for example as described in WO2011/107729 and WO2011/107746, which are incorporated herein by reference.

INTRODUCTION

WO2011/107729 and WO2011/107746 describe a method of operating a coordinate positioning machine comprising mapping a master part of a series of nominally identical parts to a coordinate positioning machine then using that mapping as a basis for measuring the remaining parts of the series (typically called gauging).

Figure 1:
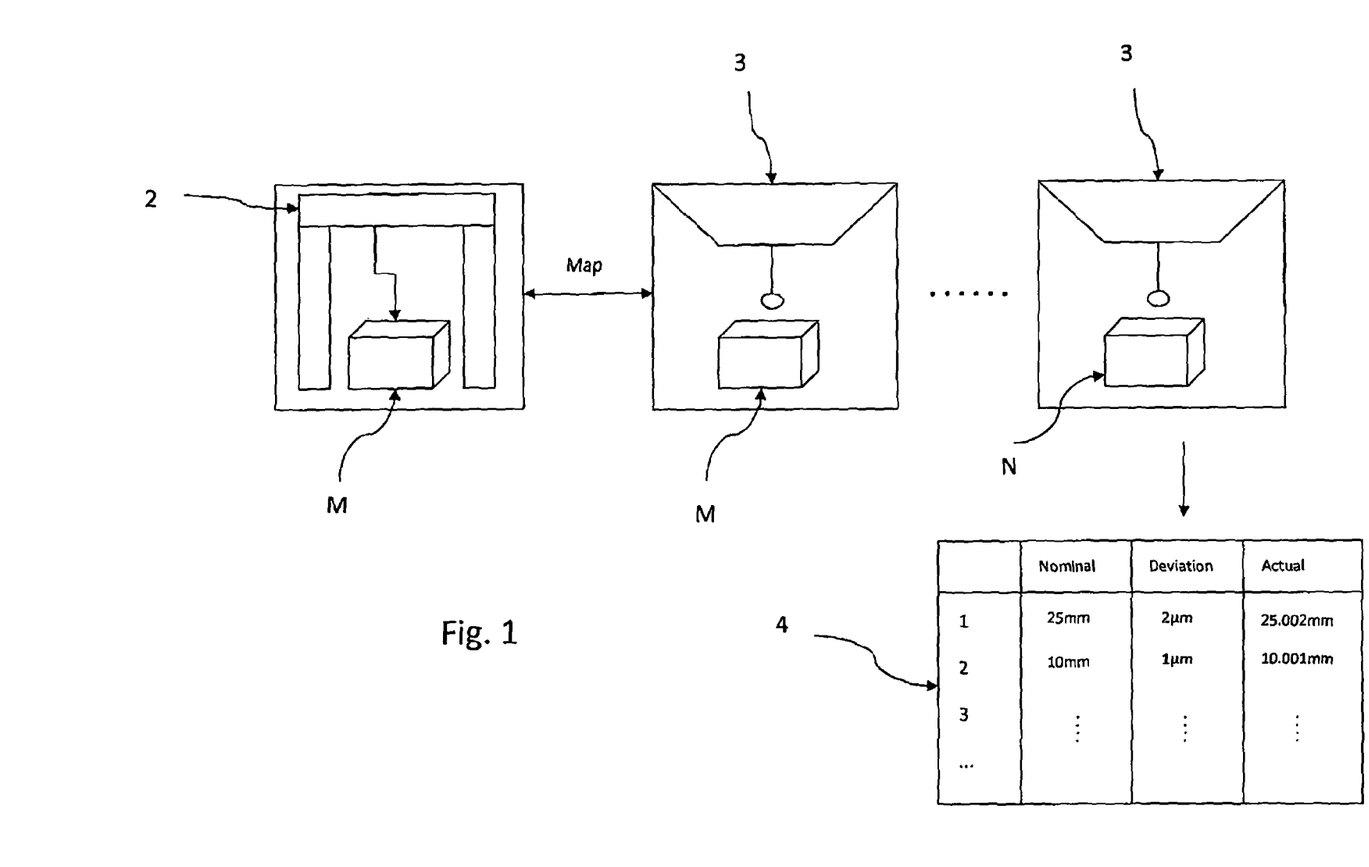
FIG. 1 shows a method of measuring a set of nominally identical parts using a coordinate positioning machine.
Figure 2:
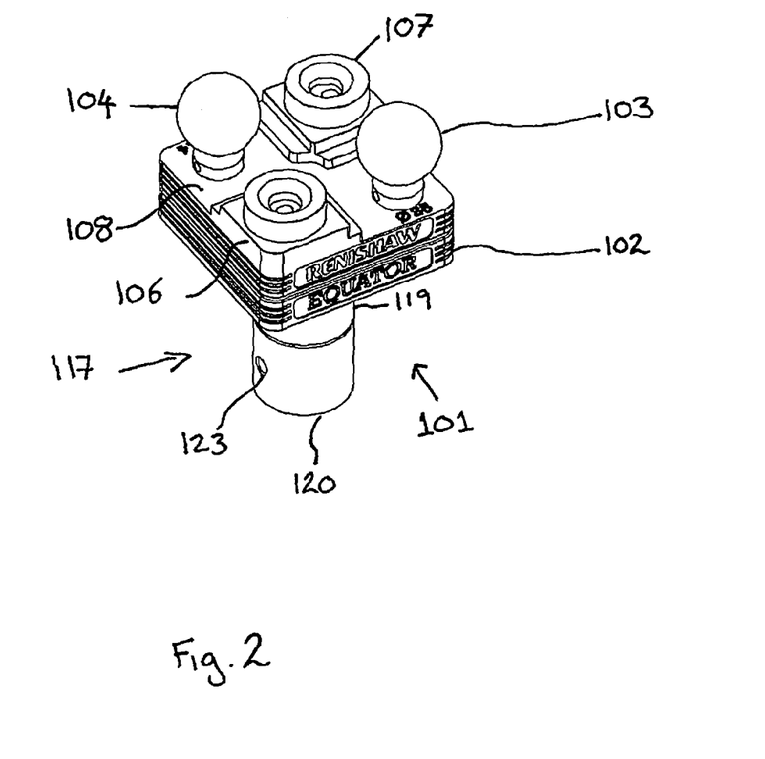
FIG. 2 is a perspective view of a gauge artefact according to one embodiment of the invention.

This method is schematically illustrated in FIG. 1. First the master part M is measured in a calibrated coordinate positioning machine, such as a coordinate measuring machine 2, which has been calibrated to ensure that the positional measurements are linear across the required extent of measurement, eg at least the volume occupied by the master part M, to determine reference values for the master part. The master part M is then measured by the coordinate positioning machine 3 to be calibrated. A map is generated of values of the points measured on the master part M by the coordinate positioning machine 3 based upon the reference values measured using coordinate measuring machine 2. Further parts, N, of the series are then measured in the coordinate positioning machine 3 and these measurements compared to those made for the master part M. A deviation of part N for each point, 1, 2, 3 . . . , etc from the master part M can then be determined as illustrated by table 4. The advantage of such a method is that the coordinate positioning machine does not need to be linear across the entire volume of the machine but only across the volume in which points measured on parts N deviate from the equivalent points on the master part M.

SUMMARY OF INVENTION

According to a first aspect of the invention there is provided a gauge artefact comprising a base for mounting on a table of a coordinate positioning machine and a platform comprising at least two portions having a nominally identical geometric property, the platform locatable relative to the base in at least two positions such that each of the at least two portions having the nominally identical geometric property can be presented at a common location relative to the base.

It will be understood that the term "nominally identical geometric property" means a like, but non-identical, geometric property. Furthermore, the term "nominally" is used as the geometric property is like that of the other portion to the extent that the difference(s) are of a comparable size to acceptable deviations (process variations) in parts to be measured by the coordinate positioning machine. A difference in the nominally identical geometric property of the portions may be small, such as a small difference in the relative positioning of identically sized shapes, such as a sphere or a bore, when in the common location or a small difference in a dimension of the shape. Typically, the deviato the base can be interchanged by movement of the platform between the two or more distinct positions.

The term "interchange" is not limited to the swapping of two portions upon a single repositioning of the platform. For example, it may not be possible to swap any two portions through a single repositioning when the platform comprises an odd number of portions having the nominally identical geometric property, such as if the portions are triangularly spaced about a centre of rotation.

Preferably, the positions in which the platform can be mounted on the base are arranged such that the platform has to be rotated in order to move the platform between the two positions. The platform may, at least in part, exhibit nominal rotational symmetry such that the platform can be rotated relative to the base to interchange the locations of the nominally symmetric parts of the platform.

According to a third aspect of the invention there is provided a gauge artefact comprising a base for mounting on a table of a coordinate positioning machine and a platform locatable on the base, wherein the platform, at least in part, exhibits nominal rotational symmetry such that the platform can be rotated relative to the base to interchange the locations of the nominally symmetric parts of the platform.

The rotational symmetry exhibited by the platform provides a simple mechanical arrangement for interchanging portions of the platform having nominally identical geometric properties. It will be understood that the term "nominal rotational symmetry" means that under a rotational translation of the platform, the platform presents at least one like, but non-identical, geometric property. The term "nominal" is used as the geometric property presented on rotation is like that presented before rotation to the extent that the platform in each position can be considered a series of nominally identical parts, even though the platform has been intentionally manufactured such that the properties are non-identical in each position. The small difference presented upon rotation of the platform may be of a comparable size to possible deviations in a series of parts that are to be measured by the coordinate positioning machine. Typically, the deviations will be less than 1 mm if not of the order of hundreds or tens of micrometers or smaller. Furthermore, the term "at least in part" means that only parts of the platform need to exhibit nominal rotational symmetry, whereas other parts may not exhibit rotational symmetry.

The gauge artefact may comprise formations on the base and the platform that define locations such that platform has to be rotated to be moved between the locations. The platform may exhibit, at least in part, nominal mirror symmetry, and the locations comprise a pair of locations which require rotation of the platform by 180 degrees relative to the base in order to move the platform between the locations of the pair.

Alternatively or additionally, the movement of the platform between the at least two positions may require linear movement of the platform relative to the base.

The gauge artefact may comprise cooperating mounting formation on the base and the platform, which, when engaged define two or more positions on the base in which the platform can be located. One of the base and the platform may comprise a set of three formations arranged to cooperate with two or more sets of three corresponding formations on the other one of the platform and the base to provide the two or more defined positions. In one embodiment, each formation may comprise a slot or a ball (or possibly a hemisphere) on one of the base and the platform arranged to cooperate with a ball or slot, respectively, on the other of the platform and the base.

The mounting formations may define one or more kinematic locations. It will be understood that the term "kinematic location" as used herein means a location on a body, eg the base, in which another body, eg the platform, can be positioned such that the relative position of the bodies is defined in six degrees of freedom.

The gauge artefact may comprise an alignment element for limiting positioning of the platform on the base to a subset of the total possible number of defined locations provided by the formations. For example, without the alignment element, the formations may provide six possible defined locations, whereas the alignment element may confine positioning of the platform to two of these locations.

The gauge artefact may comprise biasing for urging platform and the base together. For example, the biasing may comprise a magnet for urging the formations together.

According to a fourth aspect of the invention there is provided a gauge artefact comprising a base and one or more elements reconfigurable relative to the base between two or more configurations, wherein, in each configuration, the one or more elements present a like, but non-identical, part for measurement by a coordinate positioning machine in the same position relative to the base.

According to a fifth aspect of the invention there is provided a platform of a gauge artefact the platform comprising at least two portions having a nominally identical geometric property and mounting formations arranged to cooperate with mounting formations of a base of the gauge artefact such that the platform is locatable relative to the base in at least two positions whereby each of the at least two portions having the nominally identical geometric property can be presented at a common location relative to the base.

According to a sixth aspect of the invention there is provided, in combination, a first body and a second body, the first and second body comprising cooperating formations that form a mount for confining relative positioning of the first and second bodies to a plurality of kinematic locations when the formations are engaged.

The mount may confine relative positioning of the first and second bodies to two kinematic locations when the formations are engaged.

The first and second bodies may comprise cooperating alignment elements for confining positioning of the bodies to a subset, such as two, of the plurality of kinematic locations provided by the formations.

According to a seventh aspect of the invention there is provided a method of checking a coordinate positioning machine comprising measuring with the coordinate positioning machine a geometric property of a reconfigurable gauge artefact when the gauge artefact is in first and second configurations, comparing a difference in the measurements of the geometric property obtained when the gauge artefact is in the first and second configurations to a known deviation and determining whether the coordinate positioning machine is operating satisfactorily based upon the comparison.

By this method, a coordinate positioning machine may be checked to determine whether the machine can measure to the required accuracy small deviations of a geometric property in a series of parts. In one embodiment, the method may further comprise determining a correction factor for measurements taken by the machine based upon the comparison. The method may comprise measuring with the coordinate positioning machine a geometric property of the reconfigurable gauge artefact when the gauge artefact is in further configurations. Additional configurations may provide further deviations in the geometric property different from the deviation provided between the first and second configurations. Measuring multiple deviations in the geometric property may allow a more accurate correction factor to be determined, for example, if errors in the measurement of the deviation do not vary linearly with the magnitude of the deviation.

The method may comprise measuring more than one geometric property of the gauge artefact in each configuration. The measurement of the more than one geometric property may be at spaced apart locations on the gauge artefact. Separate correction factors may be determined for each location in which a geometric property is measured. Reconfiguring the gauge artefact may comprise interchanging two or more portions having a nominally identical geometric property corresponding to the geometric property to be measured by the coordinate positioning machine.

This method may be carried out at multiple locations throughout the coordinate positioning machine. The locations may correspond to the location of points to be measured on a set of parts.

The method may comprise using a gauge artefact according to the first, second, third or fourth aspects of the invention.

The known deviation may be determined by measuring the gauge artefact on a coordinate positioning machine that has been calibrated.

DESCRIPTION OF THE DRAWINGS

Embodiments of the invention will now be described, by example only, with reference to the accompanying drawings, in which.

DESCRIPTION OF EMBODIMENTS OF THE INVENTION

Referring to FIGS. 2 to 7, a gauge artefact 101 is shown comprising a base 102 for mounting on a coordinate positioning machine and a platform 108 mountable on the base 102 at defined locations as dictated by mount 105, each location defining a configuration of the gauge artefact.

The platform 108 has surface features that can be used for checking measurements of a coordinate positioning machine. In this embodiment, the surface of the platform 108 has nominal reflective symmetry about the two dotted lines 190, 191 shown in FIG. 6, which extend between the corners of the platform (and therefore, also 180 degree nominal rotational symmetry). Accordingly, platform 108 has at least two portions having a nominally identical geometric property and the platform 108 is locatable relative to the base 102 in the defined locations such that each of the at least two portions having the nominally identical geometric property can be presented at a common location relative to the base 102. In this embodiment, there are numerous geometric properties of the surface on which a check may be based, these geometric properties extending across different sized volumes to allow checking of a coordinate positioning machine for a particular expected deviation (process variation) in a series of parts. Confining checking to only the expected process variation may speed up the process or allow finer checking of the measurements within the expected process variation.

In this embodiment, the surface of the platform 108 comprises two spheres 103, 104 and two complex shaped projections 106, 107. Spheres 103 and 104 are of slightly different radii, with the radius of the sphere 104 being 25.4 mm as opposed to the 25 mm sphere 103. Projections 106 and 107 comprise a plurality of similar bores and spherical and planar surfaces, with the relative locations of the planar surfaces and the centre of the bores of one projection 106 being slightly offset relative to that of the other projection 107, as described in more detail below.

In this embodiment, projections 106 and 107 are moulded or machined to form an integral part of the platform 108 whereas spheres 103 and 104 each comprise fastening means for removably connecting the spheres 103, 104 to the platform 108. The fastening means in this embodiment is provided by cooperating screw threads (not shown) on a stalk supporting the spheres 103, 104 and the platform 108. A bore 103a, 104a is provided in the stalk of each sphere 103, 104 for receiving a tool for tightening the sphere in place on the platform 108. The screw threads do not provide for kinematic location of the spheres 103, 104 on the platform 108. Accordingly, in the event that one or both of the spheres 103, 104 are loosened and/or removed, the platform 108 should be re-measured in a calibrated coordinate positioning machine when retightened/reattached. The removable fastening of spheres 103, 104 to the platform 108 allows the spheres 103, 104 to be replaced or exchanged, if required.

Projections 106 and 107 differ in a number of ways. A lower part of each projection 106, 107 comprises two stepped sections located at right angles to each other. In this way, each projection 106, 107 provides a pair of planar surfaces for measurement in the x, y and z directions (or in the case of measurement in the z-direction—four planar surfaces external to the bores). The relative distance between corresponding planar surfaces is different for each projection 106, 107. Mounted on top of the stepped planar section is an elliptical cylindrical section in which is formed a series of circular bores. The bores of both projections 106, 107 are the same size but the bores of projection 106 are concentric, whereas the bores of projection 107 are eccentric. The bores comprise both vertical (z-direction) walls and walls angled relative to the vertical (as illustrated clearly in FIG. 7). The outer surface of the elliptical sections of the projections 106, 107 may comprise differing ratios between the major and minor axes.

The platform 108 has numerous geometric properties that have a nominally identical counterpart in a different portion of the platform 108, the platform 108 rotatable relative to the base 102 to interchange these geometric properties. For example, the one or more comparable geometric properties on which a check is based may be a comparison of a geometric property of the spheres 103, 104 or projections 106, 107 or a geometric property of sphere and projection combinations, such as a distance between the centre of the sphere 103, 104 and a centre of a bore of the projection 106, 107.

Figure 3:
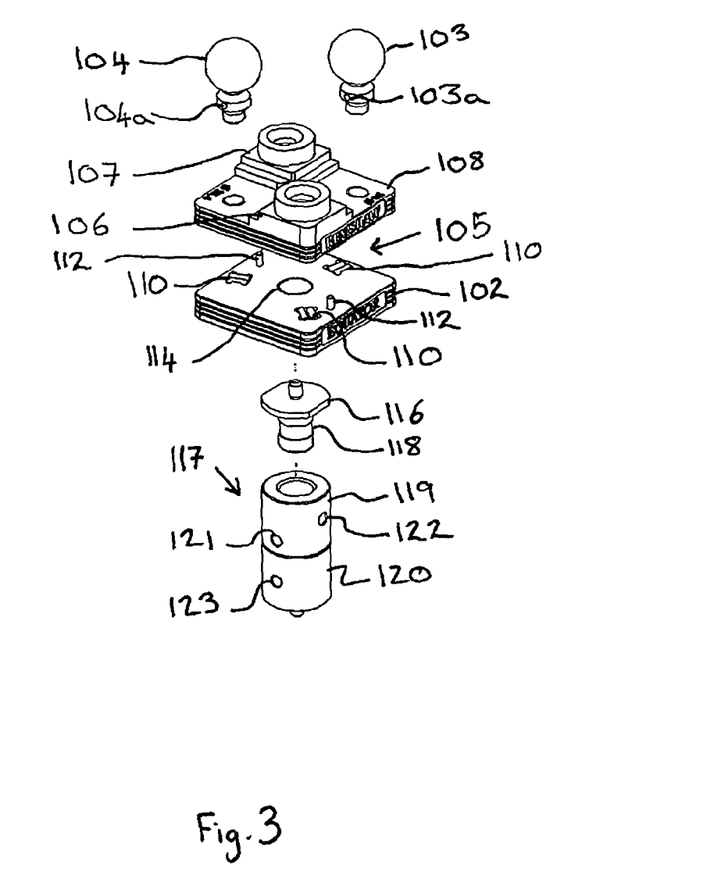
FIG. 3 is an exploded, perspective view of the gauge artefact shown in FIG. 2.
Figure 4:
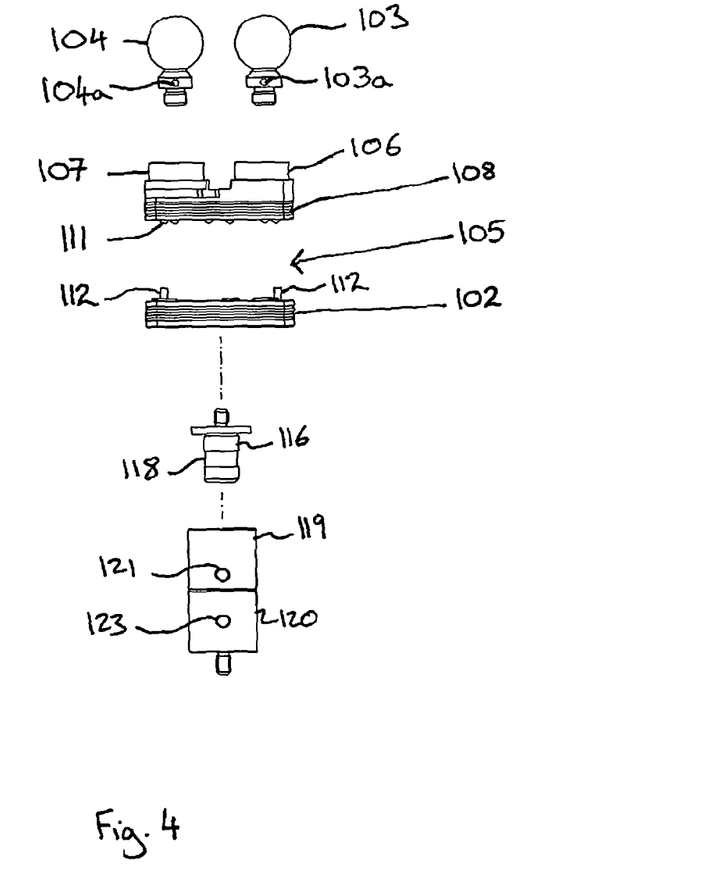
FIG. 4 is an exploded, side view of the gauge artefact shown in FIG. 2.
Figure 5:
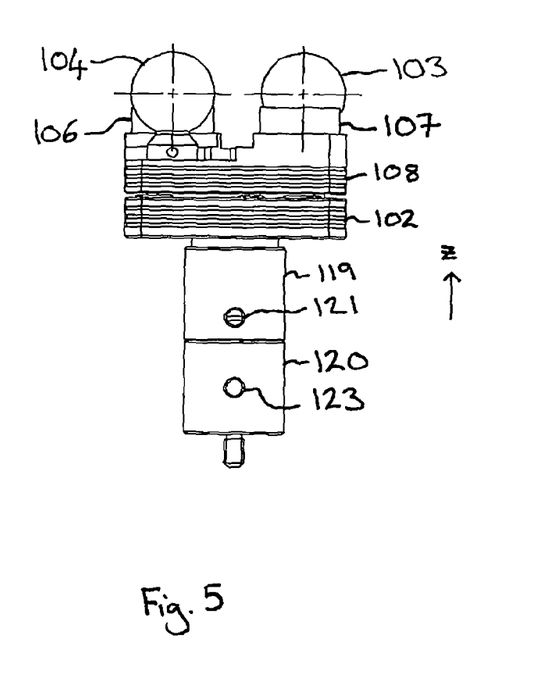
FIG. 5 is a side view of the gauge artefact shown in FIG. 1.
Figure 6:
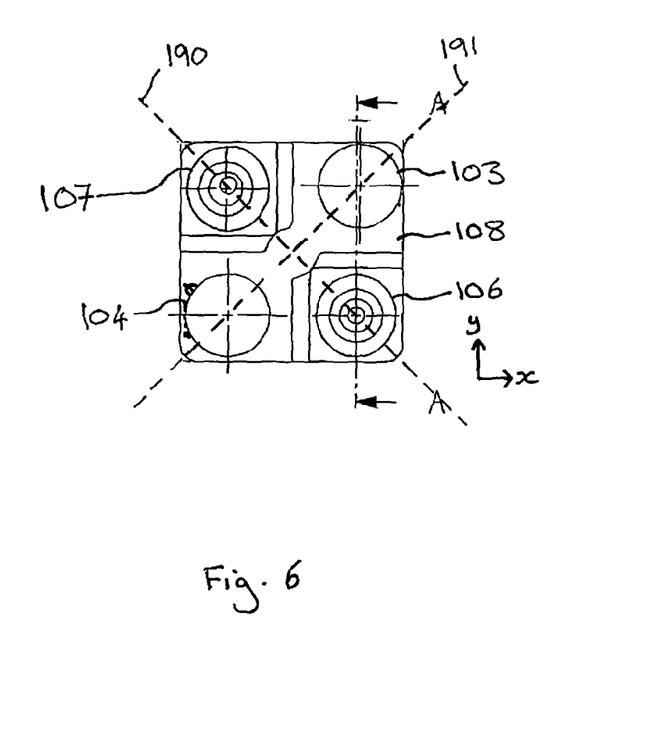
FIG. 6 is a plan view of the gauge artefact shown in FIG. 1.
Figure 7:
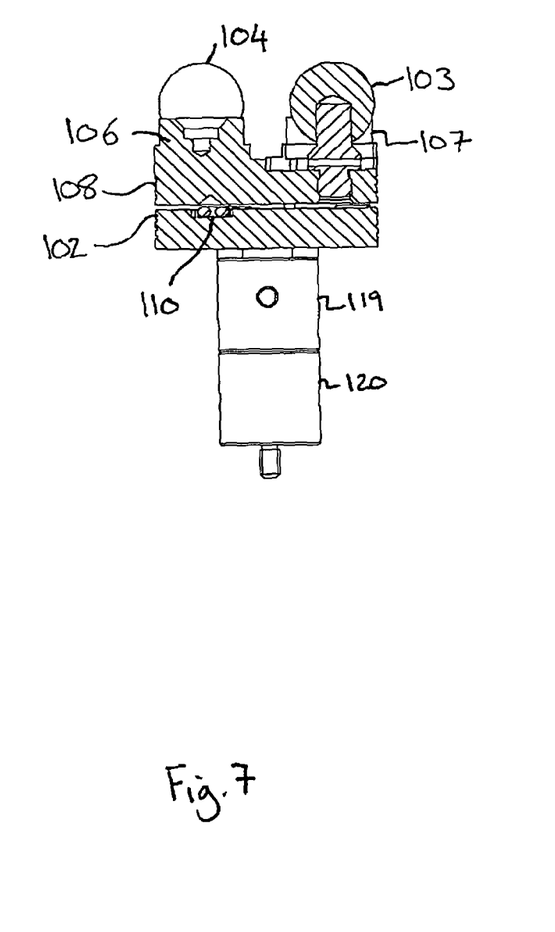
FIG. 7 is a cross-section view of the gauge artefact along the line A-A as illustrated in FIG. 6.
Figure 8:
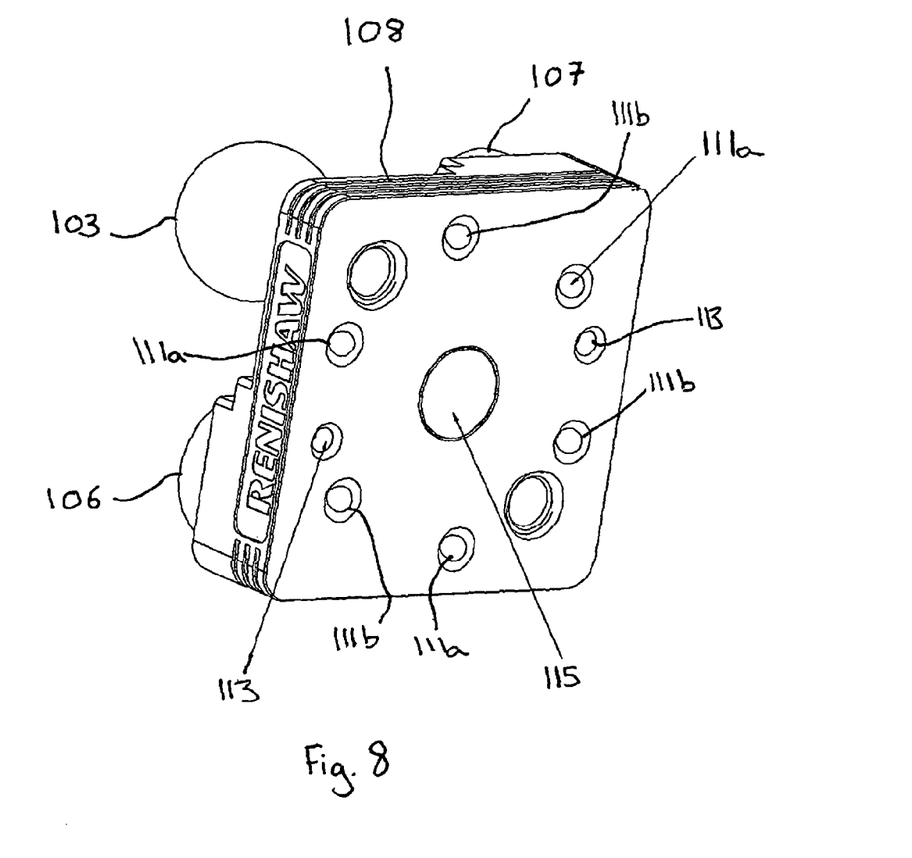
FIG. 8 is a perspective view of a platform of the gauge artefact shown in FIG. 1.

Now referring to FIGS. 3 and 8, the mount 105 comprises a set of three formations 110 on the base 102 arranged to cooperate with two sets of three corresponding formations 111 on the platform 108.

Each formation 110 on the base 102 comprises a slot, the three slots extending in different directions, in this embodiment, each lying perpendicular to the same circle. Each slot is formed by fixing a pair of cylindrical rods in parallel on the base 102. In this embodiment, each pair of rods is fixed in an H-shaped cavity in the base 102 by a suitable resin.

Each formation 111 on the platform 108 comprises a ball that is fixed in a circular shaped cavity in the platform 108 such that a hemisphere of the ball is exposed. In this embodiment, balls 111a form one set of formations for cooperating with formations 110 to provide one kinematic location and balls 111b form a second set of formations for cooperating with formations 110 to provide a second kinematic location. The balls 111a, 111b of a set are spaced apart so that they can be engaged together with the slots formed in the base 102 and the balls 111a of one set are spaced from the balls 111b of the other set to define a pair of kinematic locations that require the platform 108 to be rotated by 180 degrees in order to move the platform 108 between the kinematic locations. To achieve this, each ball 111a of one set has a corresponding ball 111b of the other set that is diametrically opposite and equidistant from the centre of the intended rotation. In this embodiment, with the slots 110 being equidistant from each other, the balls 111a or 111b of each set are also equidistant from each other and together the six balls 111a and 111b of both sets are equidistantly spaced around a circle centred at the centre of rotation. Slight unintentional misplacement of the balls 111 during manufacture may result in the two kinematic locations not quite being 180 degrees apart. However, a tolerance within which the balls 111 can be mounted on the platform 108 is small compared to the small differences in the geometric properties of the platform 108 to be used for checking measurements of a coordinate positioning machine. Of course, in another embodiment, it may be desirable for the kinematic locations not to be exactly 180 degrees apart in order that there is an intended deviation in the positioning of the geometric properties relative to the base 102 upon rotation of the platform, which can be used for checking of the coordinate positioning machine.

The mount 105 further comprises alignment elements 112, 113 that cooperate together to limit positioning of the platform 108 on the base 102 to a subset of the total possible number of kinematic locations provided by the formations 110, 111. In this embodiment, without the alignment elements 112, 113, the formations 110, 111 provide six possible kinematic locations, whereas the alignment element 112, 113 confine positioning of the platform to two of these kinematic locations. The alignment elements in this embodiment comprise a pair of protrusions 112 that project from base 102 and are received in recesses 113 in the platform 108 to limit positioning of the platform 108 on the base 102. In a further embodiment, a single protrusion 112 may be provided.

Magnets 114, 115 are provided on the base 102 and the platform 108 for urging formations 110, 111 of the kinematic mount together.

The base 102 further comprises a spigot 116 for fixing the base 102 to a table of a coordinate positioning machine. In this embodiment, the base 102 is fixed to a table of the coordinate positioning machine by a gauge artefact holder 117. The gauge artefact holder 117 comprises a pair of detachable connectors 119, 120. Spigot 116 comprises a central groove 118 that can be engaged by a locking device (not shown) in connector 119 for securing the spigot 116 to connector 119, whilst allowing rotation of the spigot 116 relative to the connector 119. The locking device is operated using an appropriate locking tool inserted through hole 121. A locking screw (not shown) threaded in hole 122 can be tightened to lock the spigot 116, and therefore the base 102, in position. Connector 120 comprises a further locking device (not shown) for locking the gauge artefact holder 117 to a table of the coordinate positioning machine. The further locking device is operated using an appropriate locking tool inserted through hole 123. Tables of different coordinate positioning machines have different features for attaching parts to the table. Accordingly, by having a connector 120 that is detachable from connector 119, an appropriate connector 120 can be chosen based on the table to which the gauge artefact is to be attached.

Figure 9:
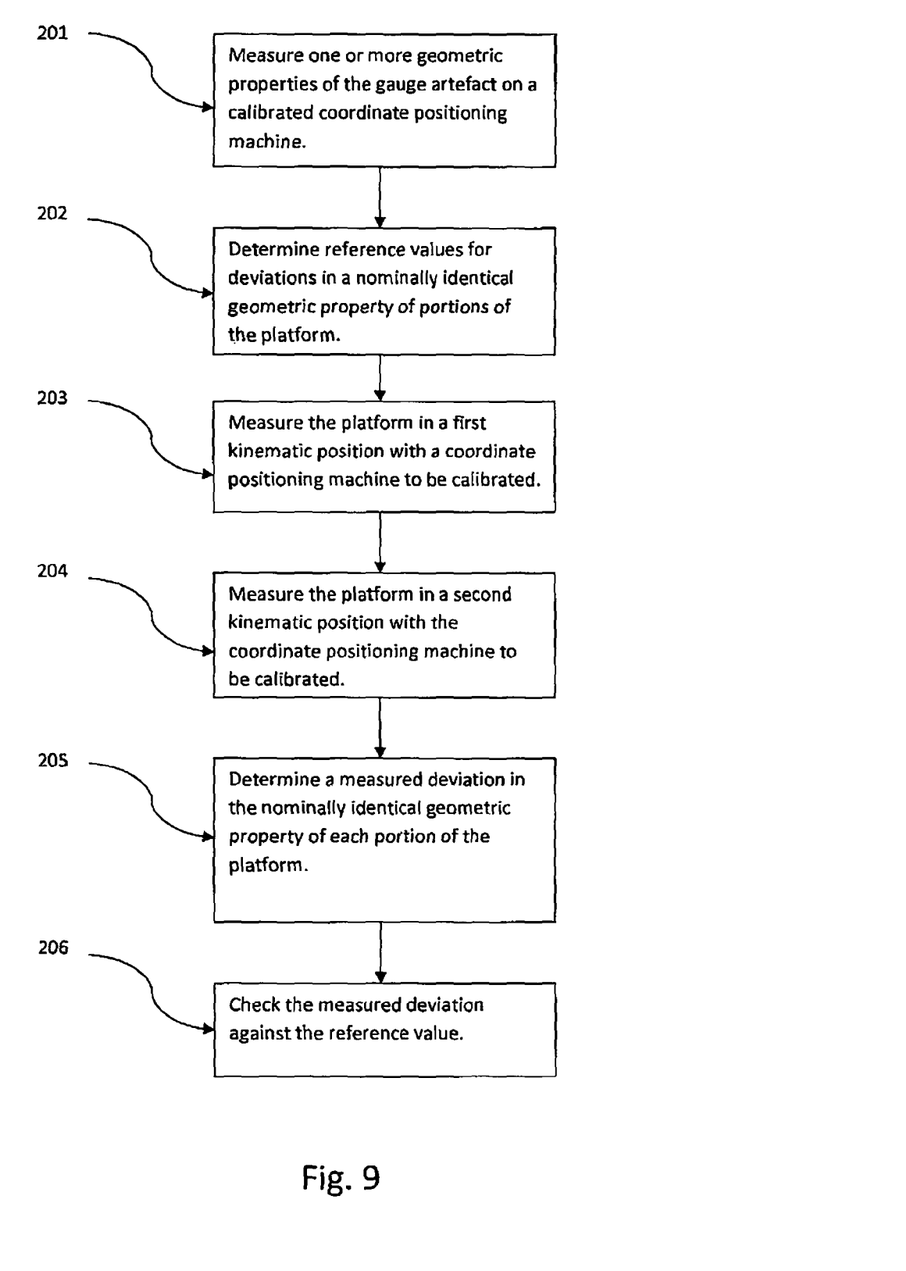
FIG. 9 is a flowchart showing a method according to one embodiment of the invention.

Now referring to FIG. 9, a method of checking a coordinate positioning machine using the gauge artefact is shown. The method comprises determining deviations between relevant nominally identical geometric properties of the platform 108 by measuring 201 these geometric properties on a calibrated coordinate positioning machine. The coordinate positioning machine may be of the type that measures actual dimensions of the platform rather than simply a relative deviation of a notionally identical part from a master element. Measurements of the platform 108 in both kinematic locations of the platform 108 on the base 102 may be carried out to take account of positional changes that may occur when the platform 108 is switched between the two locations. Reference values for the deviations between the nominally identical geometric properties are then determined 202 from these measurements. As an alternative to measuring the gauge artefact on a calibrated coordinate positioning machine, design data may be used to determine the reference values.

The same geometric properties of the platform 108 are then measured on the coordinate positioning machine to be checked. This involves measuring at a common location in the coordinate positioning machine portions of the platform 108 comprising a nominally identical geometrical property. For the gauge artefact 101 this comprises measuring the platform 108 in the first and second kinematic locations on the base 102. Thus, for each location, a deviation between the portions having a nominally identical geometric property is determined 205 and checked 206 against the reference value determined using the calibrated coordinate positioning machine. An adjustment of the coordinate positioning machine, such as a correction factor, may be determined if there is a discrepancy between the measured deviation and the reference value.

This method may be carried out at multiple locations throughout the coordinate positioning machine corresponding to the location of points to be measured on a series of parts. A mapping may be determined associating correction factors, to location.

An advantage of the gauge artefact according to the described embodiment is that two (or possibly, four) regions may be checked with only one movement of the platform 108. This is because rotation of the platform between kinematic locations locates a portion having a nominally identical geometric property to another portion of the platform 108 in the space previously occupied by that other portion and vice versa. To check a new region of the coordinate positioning machine either the locking screw can be released and the base 102 rotated to a different orientation or connector 120 can be operated to release the gauge artefact from the table for positioning the gauge artefact at a different location on the table.

The method of the invention may be implemented on different types of coordinate positioning machines. The coordinate positioning machine may comprise a coordinate measuring machine dedicated to measurement or a machine tool that can be used for both measurement and machining operations. Preferably, the coordinate positioning apparatus comprises a non-Cartesian coordinate positioning machine. A non-Cartesian coordinate positioning machine may comprise a base platform connected to a moveable platform by a plurality of extendable struts. Extension of the struts in parallel produces the required motion of the moveable platform (eg in x, y and z directions). This should be contrasted to traditional serial or bridge type coordinate measuring machines in which linear motions along multiple (eg three) mutually orthogonal linear axes is achieved by mounting linear slides in series. This method is particularly advantageous when applied to a non-Cartesian coordinate positioning machine because measurements on such machines are repeatable and linear for small distances but such linearity is difficult to achieve for larger differences.

It will be understood that modifications and alterations may be made to the above described embodiments without departing from the scope of the invention as described herein and defined in the claims.

For example, the mount 105 may provide more than two defined locations for the platform 108 on the base 102.

The invention claimed is:

1. A calibrated gauge artefact for checking a coordinate positioning machine used in a gauging method to measure a set of nominally identical parts, the calibrated gauge artefact comprising:
   a base for mounting on a table of the coordinate positioning machine; and
   a platform comprising at least two portions having a like but non-identical geometric property, the platform being locatable relative to the base in at least two positions such that each of the at least two portions can be presented at a common location relative to the base, wherein:
   a difference between the like but non-identical geometric property of each of the at least two portions when presented at the common location is known, and
   the difference between the like but non-identical geometric property is of an order of an expected deviation in the set of nominally identical parts to be measured by the coordinate positioning machine.

2. A calibrated gauge artefact according to claim 1, wherein the like but non-identical geometric property of the at least two portions differs in its shape, size and/or relative location of features when located in the common location.

3. A calibrated gauge artefact according to claim 1, wherein the platform is arranged such that the positions of the at least two portions having the like but non-identical geometric property relative to the base can be interchanged by movement of the platform between the at least two positions.

4. A calibrated gauge artefact according to claim 1, wherein the positions are arranged such that the platform has to be rotated in order to move the platform between the at least two positions.

5. A calibrated gauge artefact according to claim 4, wherein the platform, at least in part, exhibits nominal rotational symmetry.

6. A calibrated gauge artefact according to claim 1, comprising cooperating mounting formations on the base and the platform, which, when engaged, define two or more positions for the platform on the base.

7. A calibrated gauge artefact according to claim 6, wherein the mounting formations define two or more kinematic locations for the platform on the base.

8. A calibrated gauge artefact according to claim 6, comprising a set of three formations on one of the base and the platform arranged to cooperate with two or more sets of three corresponding formations on the other one of the platform and the base to provide the two or more positions.

9. A calibrated gauge artefact according to claim 6, wherein each formation comprises a slot or a ball on one of the base and the platform arranged to cooperate with a ball or slot, respectively, on the other of the platform and the base.

10. A calibrated gauge artefact according to claim 6, comprising an alignment element for limiting positioning of the platform on the base to a subset of the total possible number of defined positions provided by the formations.

11. A calibrated gauge artefact according to claim 1, comprising biasing for urging the platform on to the base.

12. A calibrated gauge artefact for checking a coordinate positioning machine used in a gauging method to measure a set of nominally identical parts, the calibrated gauge artefact comprising:
    a base; and
    a platform locatable on the base in two or more distinct positions, the platform comprising at least two portions having a like but non-identical geometric property whose positions relative to the base can be interchanged by movement of the platform between the two or more distinct positions, wherein:
    a difference between the like but non-identical geometric property of each of the at least two portions when interchanged is known, and
    the difference between the like but non-identical geometric property is of an order of an expected deviation in the set of nominally identical parts to be measured by the coordinate positioning machine.

13. A calibrated gauge artefact according to claim 12, wherein the positions are arranged such that the platform has to be rotated in order to move the platform between the two or more distinct positions.

14. A calibrated gauge artefact according to claim 13, wherein the platform, at least in part, exhibits nominal rotational symmetry.

15. A calibrated gauge artefact for checking a coordinate positioning machine used in a gauging method to measure a set of nominally identical parts, the calibrated gauge artefact comprising:
    a base for mounting on a table of the coordinate positioning machine; and
    a platform locatable on the base, the platform, at least in part, exhibiting nominal rotational symmetry such that the platform can be rotated relative to the base to interchange locations of the nominally symmetric parts of the platform, wherein:
    a difference in a geometric property of the nominally symmetric parts of the platform when the locations of the nominally symmetric parts are interchanged is known, and
    the difference in the geometric property is of an order of an expected difference in the set of nominally identical parts to be measured by the coordinate positioning machine.

16. A calibrated gauge artefact for checking a coordinate positioning machine used in a gauging method to measure a set of nominally identical parts, the calibrated gauge artefact comprising:
- a base; and
- one or more elements reconfigurable relative to the base between two or more configurations, wherein:
- in each configuration, the one or more elements present a like, but non-identical, part for measurement by the coordinate positioning machine in the same position relative to the base,
- a difference between the like but non-identical part of each of the one or more elements is known, and
- the difference between the like but non-identical part is of an order of an expected deviation in the set of nominally identical parts to be measured by the coordinate positioning machine.

17. A platform of a calibrated gauge artefact for checking a coordinate positioning machine used in a gauging method to measure a set of nominally identical parts, the platform comprising:
- at least two portions having a like but non-identical geometric property; and
- mounting formations arranged to cooperate with mounting formations of a base of the gauge artefact such that the platform is locatable relative to the base in at least two positions whereby each of the at least two portions having the like but non-identical geometric property can be presented at a common location relative to the base, wherein:
- a difference between the like but non-identical geometric property of each of the at least two portions is known, and
- the difference between the like but non-identical geometric property is of an order of an expected deviation in the set of nominally identical parts to be measured by the coordinate positioning machine.

18. A method of checking a coordinate positioning machine, the method comprising:
- measuring with the coordinate positioning machine a geometric property of a reconfigurable gauge artefact when the gauge artefact is in first and second configurations,
- comparing a difference in the measurements of the geometric property obtained when the gauge artefact is in the first and second configurations to a known deviation in the geometric property for the first and second configurations, and
- determining whether the coordinate positioning machine is operating satisfactorily based upon the comparison.

19. A method according to claim 18, comprising measuring with the coordinate positioning machine a geometric property of the reconfigurable gauge artefact when the gauge artefact is in one or more further configurations.

20. A method according to claim 18, comprising measuring more than one geometric property of the gauge artefact in each of the first and second configurations.

21. A method according to claim 20, wherein the measurement of the more than one geometric property is at spaced apart locations on the gauge artefact and separate correction factors are determined for each location in which a geometric property is measured.

22. A method according to claim 18, wherein reconfiguring the gauge artefact comprises interchanging two or more portions having a like but non-identical geometric property corresponding to the geometric property to be measured by the coordinate positioning machine.

23. A method according to claim 18, wherein the method is carried out for multiple locations of the gauge artefact throughout a measurement range of the coordinate positioning machine.

24. A method according to claim 23, wherein the locations correspond to the location of points to be measured on a series of parts.

25. A gauge artefact for checking a coordinate positioning machine, the gauge artefact comprising:
- a base for mounting on a table of the coordinate positioning machine;
- a platform having elements thereon to be measured by the coordinate positioning machine during a checking process; and
- cooperating mounting formations on the base and the platform, which, when engaged, define two or more kinematic locations for the platform on the base such that the elements can be located in two or more repeatable positions relative to the base,
- wherein a difference between a like but non-identical geometric property of each of the elements is of an order of an expected deviation in a set of nominally identical parts to be measured by the coordinate positioning machine.

* * * * *